July 17, 1928.
E. C. MORGAN
LUBRICATING MECHANISM FOR SPROCKET CHAINS
Filed Aug. 13, 1923
1,677,649
2 Sheets-Sheet 1
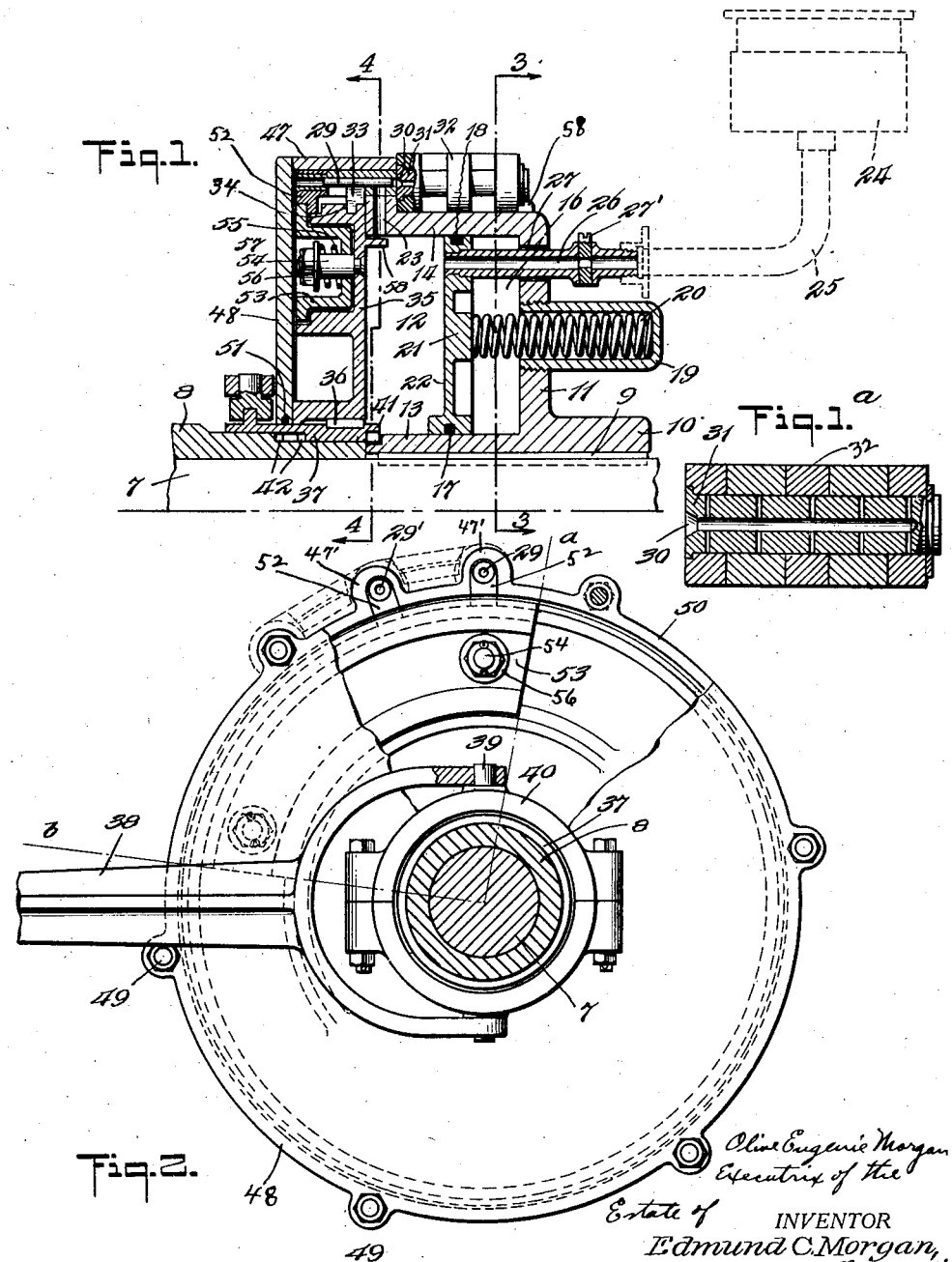

July 17, 1928.
E. C. MORGAN
1,677,649
LUBRICATING MECHANISM FOR SPROCKET CHAINS
Filed Aug. 13, 1923    2 Sheets-Sheet 2
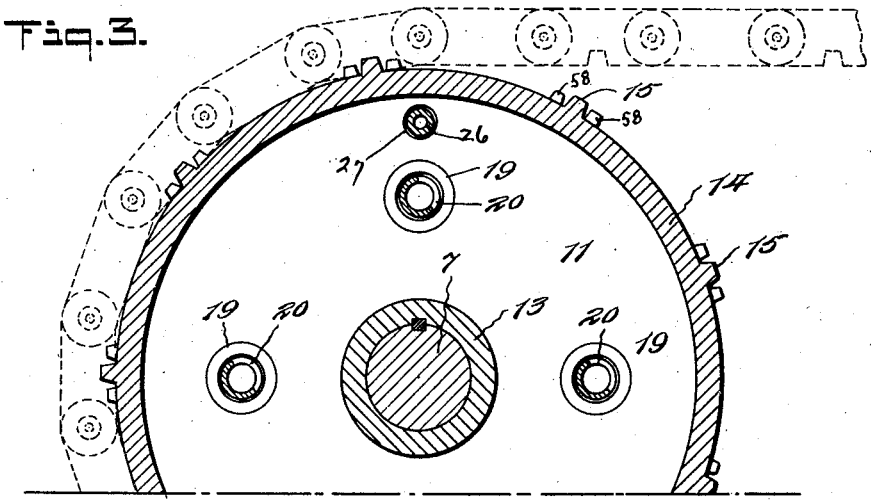
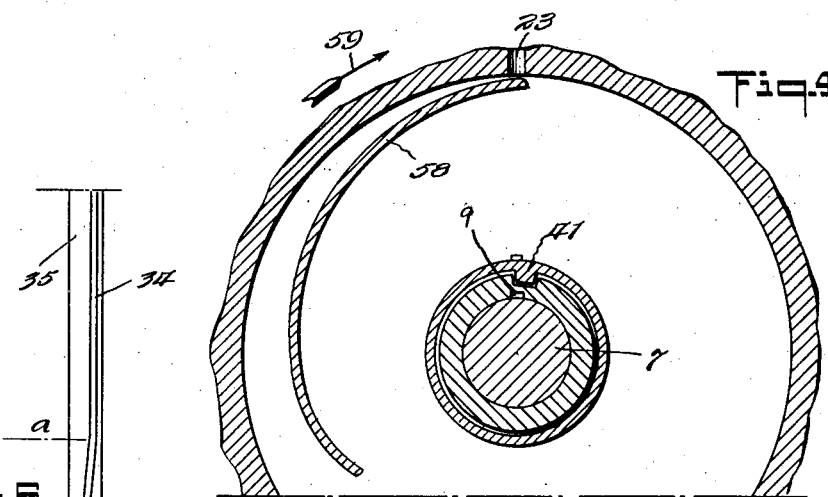
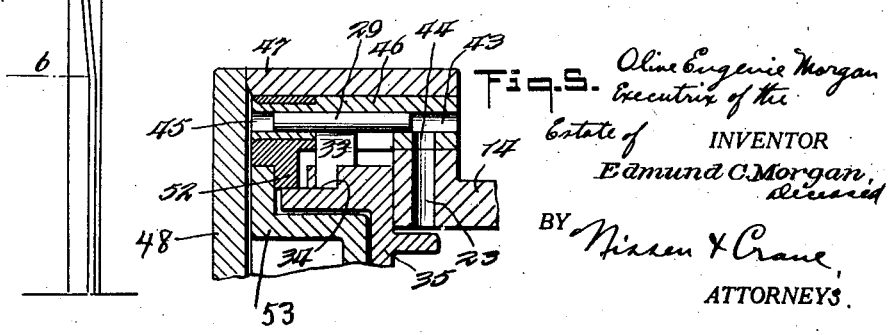
INVENTOR
Edmund C. Morgan,
ATTORNEYS.

Patented July 17, 1928.

1,677,649

UNITED STATES PATENT OFFICE.

EDMUND C. MORGAN, DECEASED, LATE OF NEW YORK, N. Y., BY OLIVE EUGENIE MORGAN, EXECUTRIX, OF NEW YORK, N. Y.

LUBRICATING MECHANISM FOR SPROCKET CHAINS.

Application filed August 13, 1923. Serial No. 656,988.

This invention relates to mechanism for lubricating the bearings of sprocket chains and is particularly applicable to cutter chains of coal mining machines.

One of the objects of the present invention is the provision of mechanism for efficiently lubricating the bearings of a sprocket chain.

Another object of the invention is the provision of automatic mechanism for applying lubricating material to the pivotal connections between the links of the sprocket chain.

A further object of the invention is the provision of mechanism associated with the sprocket wheel for lubricating the pivotal connections between the links of the sprocket chain which meshes with such sprocket wheel.

More particularly it is the object of the present invention to provide automatic mechanism associated with a driving sprocket of a cutter chain of a coal mining machine for applying lubricating material to the lubricating passages of pivot pins between links of the cutter chain, during the operation of the latter and without interfering with such operation; in a co-pending application bearing Serial Number 656,987 filed August 13, 1923, a chain cutter for mining machines is shown, described and claimed and is of a type to which the present invention is particularly applicable although the present invention may have a general application to sprocket chains.

Other objects of the invention will appear hereinafter, the novel features and combinations being set forth in the appended claims.

Referring to the accompanying drawings Fig. 1 is a sectional elevation of the lubricating mechanism embodying certain features of the present invention;

Fig. 1ª is a sectional view of a pivotal connection between the links of the sprocket chain showing the passages for directing lubricant to the bearings between the chain links;

Fig. 2 is an elevational view of the improvements applied to a driving sprocket, certain portions being broken away;

Fig. 3 is a sectional elevation taken on the line 3—3 of Fig. 1 looking in the direction of the arrows;

Fig. 4 is a sectional elevation taken on the line 4—4 of Fig. 1 looking in the direction of the arrows;

Fig. 5 is an enlarged view of the upper left hand portion of Fig. 1; and

Fig. 6 is a development in plan to show diagrammatically the cam groove for operating the valve for controlling the admission of lubricant to the passage-ways in the pivot pins one of which is shown in Fig. 1ª.

As shown in Fig. 1 a driving shaft 7 is journaled in a stationary bearing 8. Keyed at 9 to the driving shaft 7 is the hub 10 of a sprocket 11 so that when the shaft 7 rotates the sprocket 11 will be rotated therewith. The sprocket 11 is provided with a large annular recess 12 which is formed by an extension 13 of the hub 10 and the cylindrical extension 14 on the outer surface of which are located the transversely extending sprocket teeth 15 for engaging alternate links as illustrated in Fig. 3.

In the annular recess 16 is located a loose annular ring provided with concentric gaskets 17 and 18 which fit the concentric cylindrical walls of the recess 16. The sprocket 11 may be provided with four cups 19 spaced 90 degrees apart for receiving the springs 20 which are mounted to exert pressure on the projections 21 at the back of the annular ring 22. These springs by exerting pressure on the ring 22 cause the lubricant in the chamber 12 to be moved into the passageways 23 in the outer edge of the cylinder 14.

Lubricant may be introduced from the cup 24 through the pipe 25 into the pipe 26 which is secured to the ring 22 so as to move bodily therewith. An opening at 27 in the sprocket 11 is provided so that the pipe 26 may move freely relatively to the sprocket. A valve 27' controls the flow of lubricant from the cup 24 to the chamber 12. It should be understood that when the springs 20 move the ring 22 in the recess 16 the lubricant cup 24 and the pipes thereto attached move bodily with the ring 22.

A valve is provided at 29 for controlling the flow of lubricant from the chamber 12 through the passage 23 into the orifice 30 of the pivot pin 31 in the hinge bearings 32 between the links of the sprocket chain. The valve rod 29 has connected rigidly thereto a radial L-shaped projection 33 which fits into a cam groove 34 of the ring 35. This ring 35 is splined at 36 to the hub 37 of a clutch which may be shifted by means of a lever 38 and the pivotal connections 39 and ring 40. Clutch teeth are provided at 41 so that when desired the rotation of the hub 13 may be imparted to the ring 35. Clutch teeth are also provided at 42 so that when the clutch ring 37 is moved to the left as viewed in Fig. 1 the ring 35 will be held stationary by being connected to the stationary frame 8 and splined at 36.

By referring to Fig. 5 the valve 29 and the parts cooperating therewith, will be better understood. The cam 34 is shown developed in plan view in Fig. 6. This cam 34 is off-set between the points $a$ and $b$, which represents a quarter turn, as illustrated diagrammatically in Fig. 2.

The valve 29 is adapted to slide back and forth in the cylindrical passageway 43 so as to open or close the port 44 shown in Fig. 5 in registry with the passageway 23. The rear end of the valve 29 moves freely in the opening 45. It should be understood that only when the radial device 33 is in the cam groove 34, between the points $a$ and $b$, is the valve 29 withdrawn to the position shown in Fig. 5. At this time the lubricant is free to pass from the chamber 12 to the passage 23, port 44 and passageway 43 into the bearing orifice 30.

Assuming the sprocket to be rotating anti-clockwise, as viewed in Fig. 2, the valve 29 will be opened during approximately a quarter turn while the sprocket chain bearings are fitted by the sprocket teeth to be in registry with the passageway 43. It is preferred to provide a pair of spaced-apart valves 29 and 29', as shown in Fig. 2, so that two adjacent bearings may be lubricated simultaneously.

As shown in Fig. 5, the valve 29 is mounted in a tube 46 which is movable relatively to the cylinder 14. The part designated 47 in Fig. 5 is integral with the cylinder 14 to rotate therewith. The ring-plate 48 is bolted, as shown at 49, in Fig. 2, to the ring 50 which is integral with the cylinder 14. A gasket is provided at 51 for the ring-plate 48. It will thus be seen that when the sprocket rotates the plate 48 rotates therewith and the chamber 12 for containing the lubricant is entirely enclosed.

The tube 46, shown in Fig. 5, is provided with a radial extension 52 which is secured rigidly to the tube 46 and fits into a slot in the frame 47 in such a manner as to prevent rotary movement of the tube 46 on its own axis. The tube 46 and the extension 52 may have a movement longitudinally relatively to the frame 14, 47, parallel to the axis of the driving shaft 7. A spring-pressed arcuate plate 53 presses on the projections 52 of two of such valve devices as that shown in Fig. 5. A pair of pins 54 are secured to the plate 53 and springs provided, as shown at 55 in Fig. 1, in position to surround the pin 54 and exert pressure between the bottom of the plate 53 and the washer 56, which is held in place by the nut 57. This arrangement assures a tight fit between the outer end of the tube 46 and the bearing pin having the orifice 30.

The ring 35 may be provided with a spiral projection 58 so that when the ring 35 is locked by the clutch teeth 42 against rotation the rotation of the sprocket, as indicated by the arrow 59 in Fig. 4, will cause the passageway 23 to receive the lubricant with an added force because of the crowding of such lubricant into the passageway 23 by the spiral shelf 58.

While only one pair of pivot pins will be lubricated when the clutch 42 is in engagement, during each rotation of the sprocket, the sprocket chain system may readily be designed so that every pivot pin will be lubricated after a certain number of revolutions of the sprocket, before a pair previously lubricated will again have lubricant applied thereto by means of the mechanism illustrated. After sufficient lubrication has been applied to the sprocket chain pivots the clutch 41 may be brought into engagement, which, as shown in Fig. 1, will be where the valve 29 closes the passageway to the orifice 43. Therefore, when it is not desired to apply lubricant to the sprocket chain bearings the clutch lever 38 may be operated to release the clutch 42 and throw in clutch 41 so that the valve 29 will be held in position shown in Fig. 1. In other words, the throwing in of the clutch 41 will cause the ring 35 to rotate with the sprocket so that there will be no relative movement between the sprocket and the ring 35, and therefore, the valve 29 will keep closed the communication between the chamber 12 and the port 43.

By referring to Fig. 2, it will be seen that a portion of the cover-plate 48 is broken away to show the plate 53 and the arrangement of the valves 29 and 29' concentrically in the projections 47'. This concentric arrangement is for the purpose of providing castings of sufficient strength to properly carry the tubes 46 and the parts connected thereto. It should be particularly noted that the spring-pressed plate 53 extends along an arc of about 90°, as indicated by the radial lines $a$ and $b$. This arrangement is provided for the reason that it is desirable to exert pressure on the tube 46 toward the chain pivots being lubricated so as to maintain a close fit at the orifices 30 and thereby prevent leakage while the oil or lubricant is being forced into the passageways of the pivot pins. The quadrant plate 53 corresponds to the cam between the points $a$ and $b$, shown in Fig. 6. That is to say, while the off-set portion of the cam 34 holds the valve 29 open the spring-pressed quadrant plate 53 exerts pressure on the tube 46 to maintain closed the connection between the port 43 and the orifice 30, while the lubricant is being forced into the passageway of the pivot pin.

As an additional assurance that the pivot pins will closely fit the tubes 46, radial projections 58 are provided on the cylinder 14 in position to engage one edge of the chain links so as to prevent the latter from sliding on the cylinder 14 away from the tubes 46.

Obviously those skilled in the art may make various changes in the details and arrangement of the parts without departing from the spirit and scope of the invention defined by the claims hereto appended, and it is therefore desired not to be restricted to the precise construction herein disclosed.

Having thus fully described and shown an embodiment of the invention, what is desired to be secured by Letters Patent of the United States is:

1. In lubricating apparatus for chains of mining machines, the combination with a sprocket wheel, of lubricating mechanism mounted concentrically upon said sprocket wheel, and means for directing lubricant from such lubricating mechanism endwise of and in alinement with the axes of the pivotal bearings between links of the chain meshing with said sprocket wheel by feeding the lubricant axially into the interior of the pivot pins.

2. In lubricating apparatus for chains of mining machines, the combination with means for containing a lubricant, of mechanism for directing a chain along a predetermined path of travel in relation to said containing means, and means comprising connected members one stationary and the other mounted on said directing mechanism to move therewith for automatically controlling the flow of such lubricant from said containing means to the chain to lubricate the latter.

3. In lubricating apparatus for sprocket chains, the combination with a sprocket wheel, of lubricating mechanism associated therewith and comprising relatively movable members one mounted on said sprocket wheel to rotate therewith, and means for controlling said lubricating mechanism to effect the automatic lubrication of a sprocket chain meshing with said sprocket wheel while the said member connected to the sprocket wheel rotates therewith.

4. In lubricating apparatus for sprocket chains, the combination with a sprocket, of lubricating mechanism associated therewith and comprising a stationary and a movable member connected to and rotatable with said sprocket, and means comprising connections between the said members for controlling said lubricating mechanism to operate to automatically lubricate a sprocket chain meshing with said sprocket during a predetermined angle of rotation of the same.

5. In lubricating apparatus for sprocket chains, the combination with a sprocket, of a lubricant container mounted on said sprocket to rotate therewith, a stationary member within said container, and means associated with said stationary member within said container for controlling a supply of lubricant to the sprocket chain while in mesh with said sprocket.

6. In lubricating apparatus for sprocket chains, the combination with a sprocket, of lubricating mechanism, a stationary member mounted concentrically with said sprocket, and means comprising a cam on said stationary member for controlling the operation of said lubricating mechanism to automatically apply lubricant to the sprocket chain only at that portion thereof meshing with the sprocket.

7. In lubricating apparatus for sprocket chains, the combination with a sprocket, of lubricating mechanism mounted to rotate with said sprocket and adapted to operate parallel to the axis of said sprocket, and means for automatically operating said lubricating mechanism to apply lubricant to the pivots between links of the sprocket chain while such pivots are in mesh with the sprocket and rendering the said lubricating mechanism inoperative to supply lubricant when such lubricating mechanism is not adjacent a pivot in mesh with the sprocket.

8. In lubricating apparatus for sprocket chains, the combination with a sprocket, of lubricating mechanism, automatic means concentric with said sprocket in position to control the application of lubricant from said lubricating mechanism to the sprocket chains, and means for controlling said automatic means to render the same operative or inoperative, at will.

9. In lubricating mechanism for sprocket chains, the combination with a sprocket wheel, of lubricating mechanism mounted thereon, means for automatically controlling the flow of lubricant from said lubricating mechanism to the pivotal bearings between links of the chain while such links mesh with said sprocket wheel, and clutch mechanism for rendering operative or inoperative at will said automatic controlling means.

10. In lubricating mechanism for sprocket chains, the combination with a sprocket, of lubricating mechanism mounted thereon, a valve for controlling the flow of lubricant from said lubricating mechanism to a pivotal bearing between links of the sprocket chain, while such links are in mesh with said sprocket, and cam mechanism for automatically holding said valve open during a predetermined angle of rotation of said sprocket to effect the flow of lubricant to said pivotal bearing over such range of angular rotation.

11. In lubricating mechanism for sprocket chains, the combination with a sprocket, of means affording an annular lubricant-chamber within said sprocket, a spring-pressed follower ring plate in said chamber in position to press against lubricant therein, a valve for controlling the flow of lubricant from said chamber to the pivotal bearing between links of a sprocket chain travelling on said sprocket, and automatic cam mechanism for opening said valve during a predetermined rotation of said sprocket, to effect the application of lubricant to such pivotal bearing, while the sprocket is rotating and the sprocket-chain is being driven.

12. In lubricating apparatus for sprocket chains, the combination with a sprocket, of lubricating mechanism mounted thereon, a valve for controlling the flow of lubricant from said lubricating mechanism to a sprocket chain traveling on the sprocket, and a cam mounted concentric with said sprocket in position for operating said valve.

13. In lubricating mechanism for sprocket chains, the combination with a sprocket, of lubricating mechanism having an outlet port, and a spiral shelf adapted to be rotated relatively to said lubricating mechanism to assist in crowding lubricant into said outlet port.

14. In lubricating mechanism for sprocket chains, the combination with a sprocket, of lubricating mechanism mounted thereon, a valve for controlling the passage of lubricant from said lubricating mechanism to a sprocket chain on said sprocket, and means on the sprocket for maintaining a close fit with the sprocket chain, while said valve is open and lubricant is being applied to said chain.

15. In lubricating mechanism, the combination with a sprocket, of lubricating mechanism mounted thereon, a valve comprising a tube, means for operating said valve and a spring-pressed device acting on said tube to effect a close fit with the sprocket chain, while said valve is open and lubricant is being applied to the chain.

16. In lubricating mechanism, the combination with a sprocket, of means affording an enclosed lubricating chamber within said sprocket, a valve for controlling the flow of lubricant from said chamber to a sprocket chain, while the latter is travelling on said sprocket, and resilient means associated with said valve for effecting a close fit with the sprocket chain, while the latter is being lubricated.

17. In lubricating mechanism, the combination with a sprocket, of lubricating mechanism mounted thereon, a valve for controlling the flow of lubricant to a sprocket chain on said sprocket, a rotary cam for operating said valve, and clutch mechanism for effecting the rotation of said cam with said sprocket when the valve is closed and to effect the holding of said cam stationary when said valve is to be intermittently opened during rotation of said sprocket.

18. In lubricating mechanism, the combination with a sprocket, of lubricating mechanism thereon, means affording a closed lubricating chamber within said sprocket, a valve comprising a carrier, said valve controlling the passage of lubricant from said chamber to a sprocket chain on said sprocket, cam mechanism for controlling said valve, and a spring-pressed plate acting on said carrier to cause the latter to effect a close fit with the sprocket chain, while the latter is being lubricated.

19. In lubricating apparatus for sprocket chains, the combination with a sprocket, of lubricating mechanism therefor, a valve at the periphery of said sprocket for controlling the passage of lubricant to an outlet port and from the latter to the pivots between sprocket chain links along lines parallel to the axis of the sprocket, means on the sprocket for maintaining the pivotal axis of a sprocket when in registry with the outlet port, and means for operating said valve to open the same when the said pivotal axis is in registry with said outlet port to effect the flow of lubricant to said pivotal axis along lines parallel to the axis of the sprocket.

20. In lubricating mechanism, the combination with a sprocket, of lubricating mechanism thereon, a valve for controlling the passage of lubricant from said lubricating mechanism to the pivotal bearings between links of a sprocket chain travelling along said sprocket, a rotary cam for automatically opening and closing said valve, a carrier for said valve, and resilient mechanism, mounted on said rotary cam in position to act on said carrier to press the same against the chain to effect a close fit therewith, while said valve is in open position and lubricant is being applied to the chain.

21. In lubricating mechanism, the combination with a sprocket, of lubricating mechanism thereon, a valve for controlling the flow of lubricant from said lubricating mechanism to the pivotal bearings of the sprocket chain travelling on said sprocket, a rotary cam adapted to automatically hold said valve open during approximately a quarter turn of said sprocket, a carrier for said valve, and a spring-pressed quadrant plate for resiliently holding said carrier to effect a close fit with the said pivotal bearings, while said valve is open and said pivotal bearings are being lubricated.

22. In lubricating apparatus for sprocket chains, the combination with a sprocket, of lubricating mechanism mounted concentrically upon said sprocket, and means located at the periphery of said sprocket in position to control said lubricating mechanism to effect the application of lubricant automatically to pivotal bearings endwise thereof along lines parallel to the axis of the sprocket between links of the sprocket chain meshing with said sprocket by feeding the lubricant axially into the interior of the pivot pins.

23. In lubricating apparatus for sprocket chains, the combination with a sprocket, of lubricating mechanism mounted thereon, a reciprocating plunger mounted on said sprocket to move bodily therewith in position to force lubricant into bearings of the sprocket chain meshing with said sprocket, and automatic means for effecting the reciprocation of said plunger.

24. In lubricating mechanism for sprocket chains, the combination with a sprocket, of lubricating mechanism mounted thereon, a valve for controlling the flow of lubricant from said lubricating mechanism to a sprocket chain traveling on said sprocket, and automatic means for operating said valve.

25. In lubricating mechanism for sprocket chains, the combination with a sprocket, of lubricating mechanism mounted thereon, a valve for controlling the flow of lubricant from said lubricating mechanism to a sprocket chain traveling on said sprocket, and means for intermittently operating said valve upon rotation of said sprocket.

26. In lubricating apparatus for sprocket chains, the combination with a sprocket, of lubricating mechanism mounted thereon and having members relatively rotatable on the same axis, and means operable by the relative rotation of such concentric members upon the rotation of said sprocket to supply lubricant to the pivotal bearings of the sprocket chain meshing with the sprocket.

27. In lubricating apparatus for sprocket chains, the combination with a sprocket, of lubricating mechanism mounted thereon and having members relatively rotatable on the same axis, means for controlling one of said members to rotate concentrically with the other or to move relatively thereto on said axis, and means operable by relative rotation of said members on said axis to supply lubricant to the sprocket chain bearings.

28. In lubricating mechanism for sprocket chains, the combination with a sprocket having a driving shaft, of lubricating mechanism mounted on said shaft and comprising one member keyed thereto and another member mounted to rotate loosely thereon, means operable by rotation of the keyed member relatively to the other member to supply lubricant to the pivotal bearings of the chain meshing with the sprocket, and mechanism comprising a clutch for connecting said member to rotate together and thereby discontinue such supply of said lubricant.

Signed at New York in the county and State of New York this 31st day of July, 1923.

OLIVE EUGENIE MORGAN,
*Executrix of the Estate of Edmund C. Morgan, Deceased.*